United States Patent
Minami et al.

(10) Patent No.: US 10,469,705 B2
(45) Date of Patent: Nov. 5, 2019

(54) MANAGEMENT DEVICE, COMMUNICATION SYSTEM, AND RECORDING MEDIUM

(71) Applicant: KONICA MINOLTA, INC., Chiyoda-ku, Tokyo (JP)

(72) Inventors: Takeshi Minami, Amagasaki (JP); Kazuya Anezaki, Itami (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 15/860,784

(22) Filed: Jan. 3, 2018

(65) Prior Publication Data

US 2018/0191923 A1    Jul. 5, 2018

(30) Foreign Application Priority Data

Jan. 5, 2017  (JP) .................. 2017-000551

(51) Int. Cl.
*H04N 1/327* (2006.01)
*H04N 1/00* (2006.01)
*H04N 1/333* (2006.01)

(52) U.S. Cl.
CPC ..... *H04N 1/32791* (2013.01); *H04N 1/00344* (2013.01); *H04N 1/33323* (2013.01); *H04N 2201/0039* (2013.01); *H04N 2201/0094* (2013.01); *H04N 2201/3223* (2013.01); *H04N 2201/3278* (2013.01); *H04N 2201/33392* (2013.01)

(58) Field of Classification Search
USPC ............ 358/1.1–3.29, 409–413, 426.08, 437
See application file for complete search history.

(56) References Cited

U.S. PATENT DOCUMENTS

| 2012/0254296 | A1* | 10/2012 | Tanzawa | H04L 69/28 709/203 |
| 2016/0373562 | A1* | 12/2016 | Chen | H04L 69/28 |
| 2016/0373954 | A1* | 12/2016 | Usui | H04W 28/0231 |

FOREIGN PATENT DOCUMENTS

| JP | 2009171193 A | 7/2009 |
| JP | 2014090352 A | 5/2014 |

* cited by examiner

*Primary Examiner* — Marcellus J Augustin
(74) *Attorney, Agent, or Firm* — Holtz, Holtz & Volek PC

(57) ABSTRACT

A management device for an image processing apparatus includes a communication interface and a hardware processor. The communication interface transmits and receives a job to be executed in the image processing apparatus. Before transmission and reception of a job, the hardware processor transmits data on a communication path of the job for measuring a communication speed to obtain information representing a communication speed of a communication path for the job transmitted and received by the communication interface, and sets a timeout time of an image processing apparatus that executes the job, based on the obtained information representing a communication speed.

15 Claims, 13 Drawing Sheets

1) WHEN SaasGW RECEIVES NOTIFICATION OF A JOB FROM A CLOUD OR AN MFP, A NETWORK SPEED IS MEASURED. THE FOLLOWING IS AN EXAMPLE OF A PRINT JOB.

2) WHEN SaasGW DETECTS THAT THE NETWORK SPEED IS SLOW OR LIKELY TO BECOME SLOW, SaasGW INQUIRES OF THE CLIENT WHAT PROTOCOL IS USED.

3) SaasGW REQUESTS THE MFP TO EXTEND A TIMEOUT TIME FOR THE PROTOCOL.

FIG.7 SEQUENCE OF CHANGING A TIMEOUT TIME

FIG.8

EXAMPLE OF DETERMINING TIMEOUT TIME FROM COMMUNICATION SPEED OF NETWORK

| RESULT OF MEASUREMENT OF COMMUNICATION SPEED (PACKET RESPONSE TIME) | LESS THAN 1 SECOND | 1 SECOND OR MORE AND LESS THAN 10 SECONDS | 10 SECOND OR MORE AND LESS THAN 30 SECONDS | 30 SECOND OR MORE |
|---|---|---|---|---|
| TIMEOUT TIME (INITIAL VALUE: 10 SECONDS) | NOT CHANGED | 20 SECONDS | 40 SECONDS | 60 SECONDS |

1) WHEN INSTRUCTION FOR PRINTING IS ISSUED FROM SMARTPHONE OR PC, PRINT DATA IS SPOOLED TO PRINT SERVER.
2) WHEN A REQUEST TO START PRINTING IS RECEIVED FROM MFP WHICH PERFORMS THE JOB, PRINT SERVER MEASURES COMMUNICATION RATE OF LOCAL NETWORK.
3) PRINT SERVER REQUESTS OUTPUT MFP TO EXTEND TIMEOUT TIME.

SEQUENCE OF CHANGING TIMEOUT TIME

MANAGEMENT DEVICE, COMMUNICATION SYSTEM, AND RECORDING MEDIUM

The entire disclosure of Japanese Patent Application No. 2017-000551, filed on Jan. 5, 2017, is incorporated herein by reference in its entirety.

BACKGROUND

Technological Field

The present disclosure relates to a communication system including an image processing apparatus and a management device in a LAN (Local Area Network).

Description of the Related Art

Conventionally, various techniques have been proposed for adjusting timeout times of communication devices. For example, Japanese Laid-Open Patent Publication No. 2014-090352 discloses a technique relevant to adjustment of a timeout time in facsimile communication. The technique is directed to a communication device which changes a response waiting time to be longer than the current response waiting time when a response packet is not received after a facsimile communication means transmits a transmission packet before the response waiting time elapses.

In a communication device when a timeout time is long, a time to wait until a timeout processing is long, and a communication system as a whole has impaired communication efficiency. On the other hand, if the timeout time is too short, a communication error occurs comparatively easily, which entails reconnection more frequently and a communication system as a whole rather has impaired communication efficiency. Thus there is a demand for a technique for communication systems to appropriately set a timeout time.

SUMMARY

To achieve at least one of the abovementioned objects, a management device reflecting one aspect of the present invention comprises a communication interface and a hardware processor. The communication interface transmits and receives a job to be executed in an image processing apparatus. Before transmission and reception of a job, the hardware processor transmits data on a communication path of the job for measuring a communication speed to obtain information representing a communication speed of a communication path for the job transmitted and received by the communication interface, and sets a timeout time of an image processing apparatus that executes the job, based on the obtained information representing a communication speed.

According to another aspect of the present disclosure, a communication system comprises an image processing apparatus which executes a job and a management device. The management device includes a hardware processor and a communication interface. The communication interface transmits and receives a job to be executed in the image processing apparatus. Before transmission and reception of a job, the hardware processor transmits data on a communication path of the job for measuring a communication speed to obtain information representing a communication speed of a communication path for the job transmitted and received by the communication interface, and sets a timeout time of an image processing apparatus that executes the job, based on the obtained information representing a communication speed.

According to still another aspect of the present disclosure, a non-transitory storage medium has stored therein a program executed by a computer configured to set a timeout time in an image processing apparatus which transmits and receives a job. The program causes the computer to: before transmission and reception of a job, transmit data on a communication path of the job for measuring a communication speed to obtain information representing a communication speed of a communication path for the job transmitted and received; and set a timeout time of an image processing apparatus that executes the job, based on the obtained information representing a communication speed.

According to still another aspect of the present disclosure, a computer-implemented method comprises, before transmission and reception of a job, transmitting data on a communication path of the job for measuring a communication speed to obtain information representing a communication speed of a communication path for the job transmitted and received. The method further comprises setting a timeout time of an image processing apparatus that executes the job, based on the obtained information representing a communication speed.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 8 is a diagram showing an example of contents of a table that defines a relationship between a response time and a timeout time.

DETAILED DESCRIPTION OF EMBODIMENTS

Hereinafter, one or more embodiments of the present invention will be described with reference to the drawings. However, the scope of the invention is not limited to the disclosed embodiments. In the following description, the same parts or components are denoted with the same signs.

Their names and functions are also the same, and a description thereof will not be repeated.

[I. Cloud Network System]

Reference will now be made to FIGS. 1 to 9 to describe a cloud network system including a management device that relays a local area network and a cloud network as an embodiment of a communication system according to the present disclosure.

<1. Outlining System Configuration>

Figure 1:
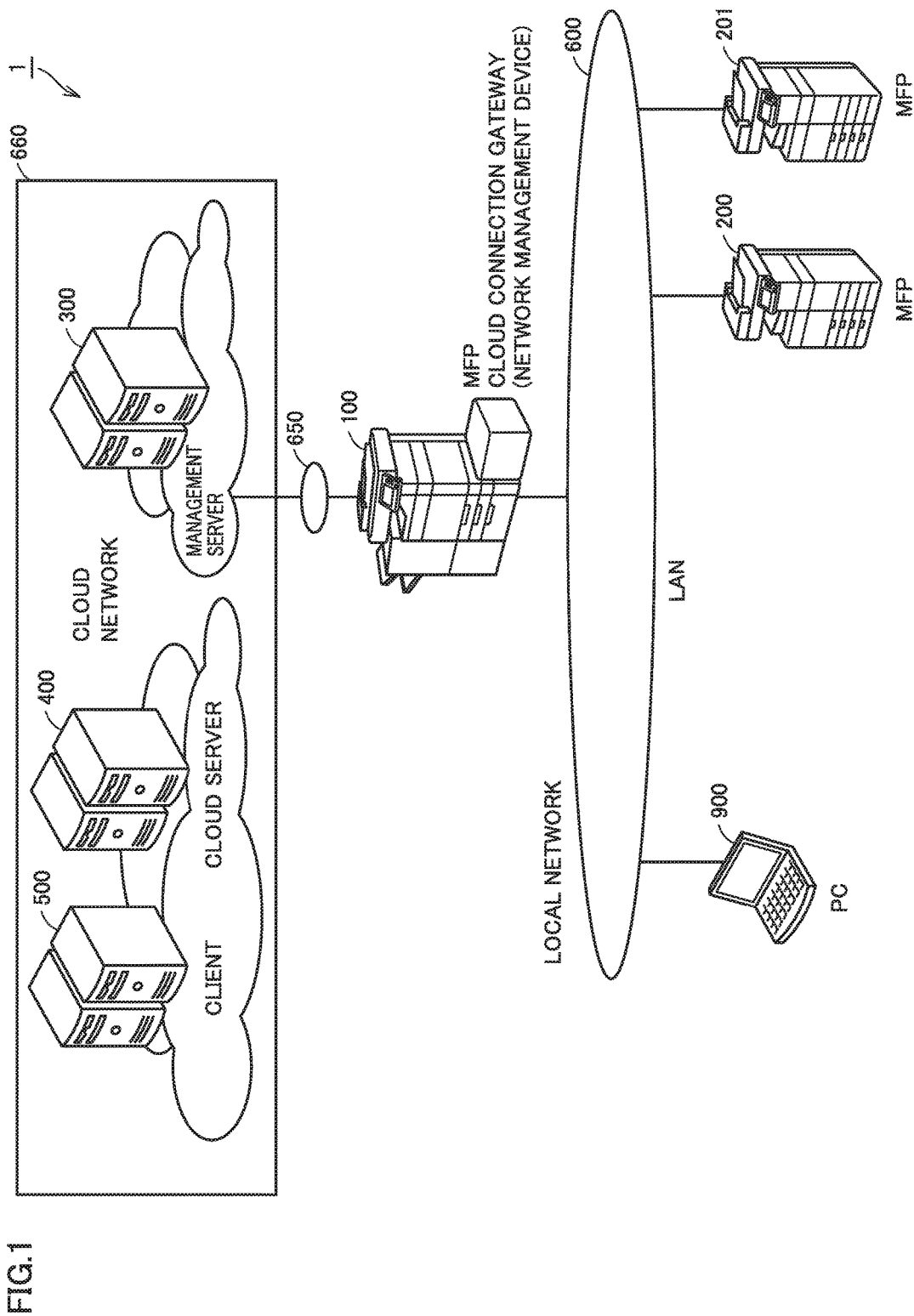
FIG. 1 is a diagram showing a schematic configuration of a communication system according to an embodiment.

FIG. 1 is a diagram showing a schematic configuration of a communication system 1 according to an embodiment. As shown in FIG. 1, communication system 1 includes a gateway 100, and devices 200 and 201 and a PC (personal computer) 900 that can be connected to one another via a local area network (LAN) 600. Gateway 100 transmits data of a job to at least devices 200 and 201. It should be noted that gateway 100 measures a communication speed of a communication path of the data of the job and, based on a result of the measurement, sets a timeout time in a device of devices 200 and 201 that executes the job. Gateway 100 is an example of a management device.

Communication system 1 also includes a management server computer (hereinafter, also simply referred to as a "management server") 300, a cloud server computer (hereinafter also simply referred to as a "cloud server") 400, and a client computer (hereinafter also simply referred to as a "client") 500 which can communicate with one another via a cloud network 660. Management server 300, cloud server 400, and client 500 are constructed using a so-called personal computer or the like.

Management server 300, cloud server 400, and client 500 are provided outside LAN 600. Gateway 100 is connected to management server 300 via network 650.

Management server 300 is a device which manages communication and the like between cloud server 400 and gateway 100. Management server 300 receives a request from cloud server 400 to access a specific device of devices 200 and 201 and in response to the request transmits a request to gateway 100 for a tunnel connection to cloud server 400.

Gateway 100 has a function to relay communication between devices 200, 201 and cloud server 400. Gateway 100 is constructed in an MFP different from devices 200 and 201. Specifically, gateway 100 is implemented by executing software (a program) incorporated in the MFP serving as hardware.

In communication system 1, for example, a print command sent from client 500 to cloud server 400 is transmitted to device 200 and/or device 201 via management server 300 and gateway 100. Device 200 and/or device 201 receive(s) the print command and perform(s) a printing operation according to the command.

In communication system 1 of FIG. 1 each element may be connected via a cable or wirelessly. In the example of FIG. 1, devices 200 and 201 are each exemplified as an MFP. The MFP is an example of an image processing apparatus.

<2. MFP's Hardware Configuration>

A configuration of the MFP will be described with reference to FIG. 2.

Figure 2:
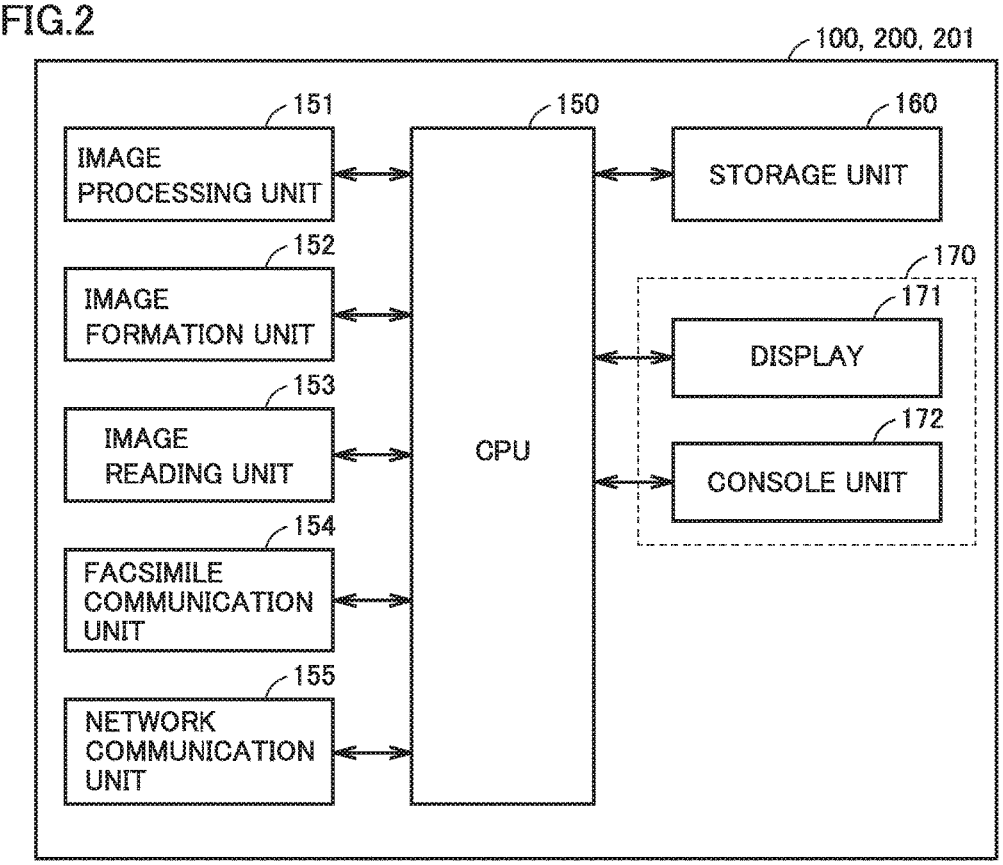
FIG. 2 is a diagram schematically showing a hardware configuration of an MFP (Multi Functional Peripheral) functioning as a gateway and a device.

As shown in FIG. 2, the MFP includes a CPU (Central Processing Unit) 150 configured to generally control the MFP, a storage unit 160, and a console panel 170.

Storage unit 160 is implemented by a storage device such as a hard disk, and stores therein a program and various data to be executed by CPU 150.

Console panel 170 includes a display 171 and a console unit 172. An example of display 171 is a liquid crystal display device. Another example of display 171 is a plasma display. Console unit 172 receives an input of an operation done to the MFP. Console unit 172 is implemented by a hardware key and/or a software key displayed on display 171.

The MFP further includes an image processing unit 151, an image formation unit 152, an image reading unit 153, a facsimile communication unit 154, and a network communication unit 155. Image processing unit 151 is implemented by, for example, hardware and/or software elements which perform various types of processing including enlarging/reducing an input image. Image formation unit 152 includes hardware and/or software elements for forming an image on a recording sheet such as a photoreceptor. Image reading unit 153 includes hardware and/or software elements such as a scanner for generating image data of an original document. Facsimile communication unit 154 includes hardware and/or software elements such as a modem for transmitting and receiving image data via facsimile communication. Network communication unit 155 includes a hardware element (a communication interface) such as a network card for performing data communication via a network.

<3. Functional Configuration of Communication System>

Figure 3:
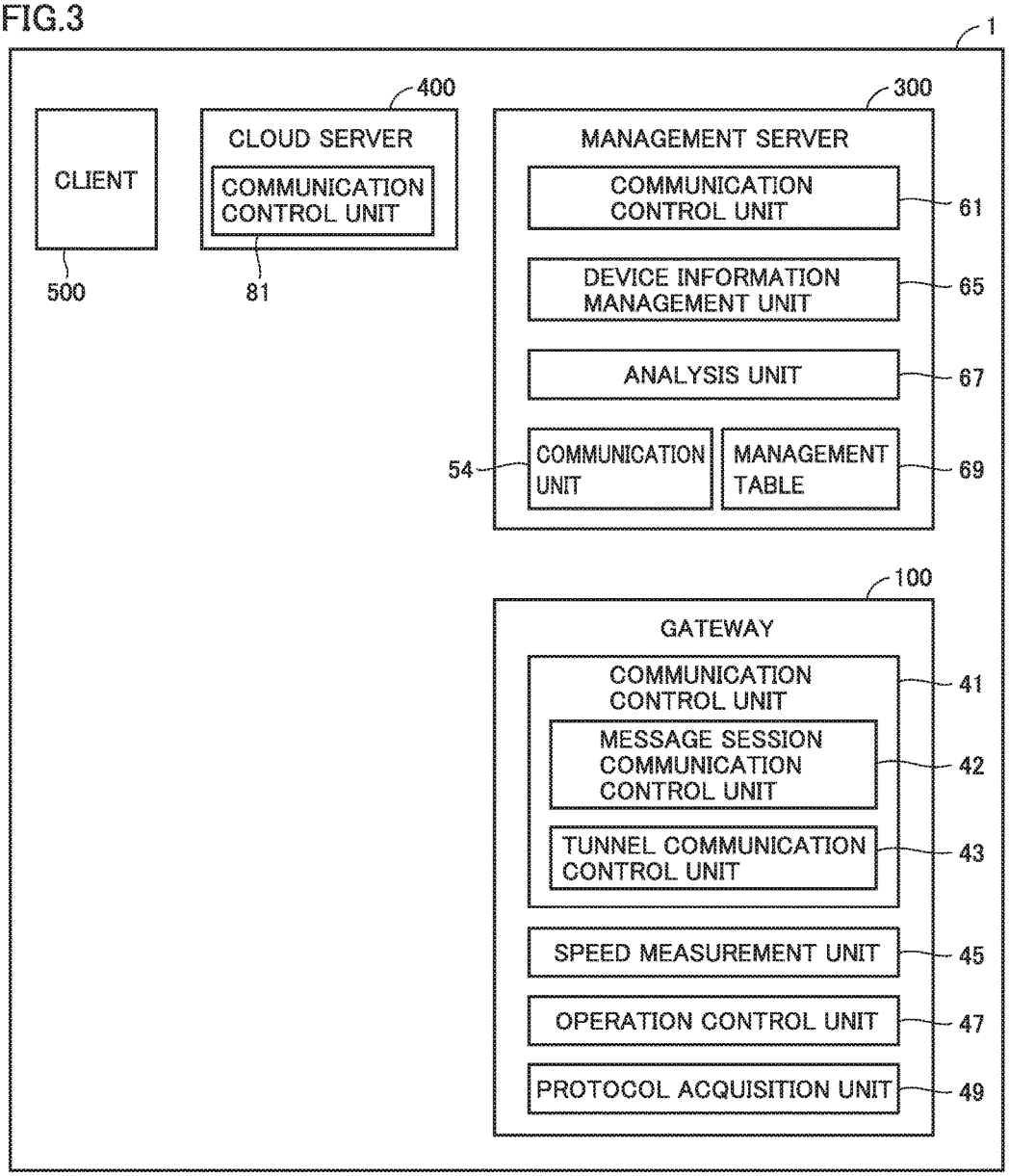
FIG. 3 is a diagram schematically showing a functional configuration of each element in the communication system.

With reference to FIG. 3, a function of each element in communication system 1 will now be described.

(Cloud Server 400)

Cloud server 400 comprises a communication control unit 81. Communication control unit 81 is implemented by a communication device such as a network card and a control device such as a processor configured to control the communication device, and controls communication between cloud server 400 and management server 300. Further, communication control unit 81 implements communication between cloud server 400 and gateway 100 by using a tunnel connection, which will be described later.

(Management Server 300)

Management server 300 includes various processing units including a communication control unit 61, a device information management unit 65, and an analysis unit 67. These various processing units are implemented for example in management server 300 by a CPU therein executing a prescribed software program (also simply referred to as a "program") stored in a storage unit (a HDD or the like). Note that the program may for example be recorded in various types of portable recording media (a DVD-ROM or the like) and installed in management server 300 via the recording medium. Alternatively, the program may be downloaded via network 650 (see FIG. 1) or the like and installed in management server 300.

Communication control unit 61 cooperates with communication unit 54 (or communicating hardware) to control various types of communication operations. For example, communication control unit 61 implements communication between cloud server 400 and management server 300, and receives an access request from cloud server 400. Further, communication control unit 61 performs communication with gateway 100 using a message session, which will be described later. In one embodiment, communication unit 54 has a transmission unit that transmits data and the like to other devices, and a reception unit that receives data and the like from other devices.

Device information management unit 65 is a processing unit that manages device information received from gateway 100 (and a management table 69 including the device information). The information stored in management table 69 includes a relationship between gateway 100 and a device 69 capable of communicating with gateway 100. Management table 69 is stored, for example, in a storage unit (an HDD (hard disk drive) or the like) of management server 300.

Analysis unit 67 is a processing unit that analyzes content of an access request received from cloud server 400. Communication control unit 61 performs processing in accordance with a result of an analysis done by analysis unit 67. For example, communication control unit 61 transmits information corresponding to the analysis result to a communication partner corresponding to the analysis result.

(Gateway 100)

Gateway 100 includes various types of processing units such as a communication control unit 41, a speed measurement unit 45, an operation control unit 47, and a protocol acquisition unit 49. These various types of processing units are implemented, for example, by a CPU of gateway 100 (CPU 150 in FIG. 2) executing a given program.

Communication control unit 41 is a processing unit that controls communication with other devices by using network communication unit 155 and/or facsimile communication unit 154. Communication control unit 41 has a message session communication control unit 42 and a tunnel communication control unit 43.

Message session communication control unit 42 is a processing unit that performs communication with management server 300 using a message session, which will be described later. Message session communication control unit 42 establishes a message session, which will be described later, with management server 300 and performs communication with management server 300.

Tunnel communication control unit 43 establishes a tunnel connection between gateway 100 and cloud server 400 using network communication unit 155, and relays communication between cloud server 400 and a specific device (for example, device 200 and/or device 201).

Rate measurement unit 45 is a processing unit using network communication unit 155 and/or facsimile communication unit 154 to measure a value representing a communication speed of a data transmission path.

Operation control unit 47 is a processing unit that controls a mode of operation of gateway 100 and a mode of operation of a device in LAN 600. For example, operation control unit 47 sets a timeout time of each device in LAN 600 and makes notification thereof.

Protocol acquisition unit 49 obtains a protocol used by client 500 and/or cloud server 400 to transmit data.

(Outlining Operation of Each Element of Communication System)

Figure 4:
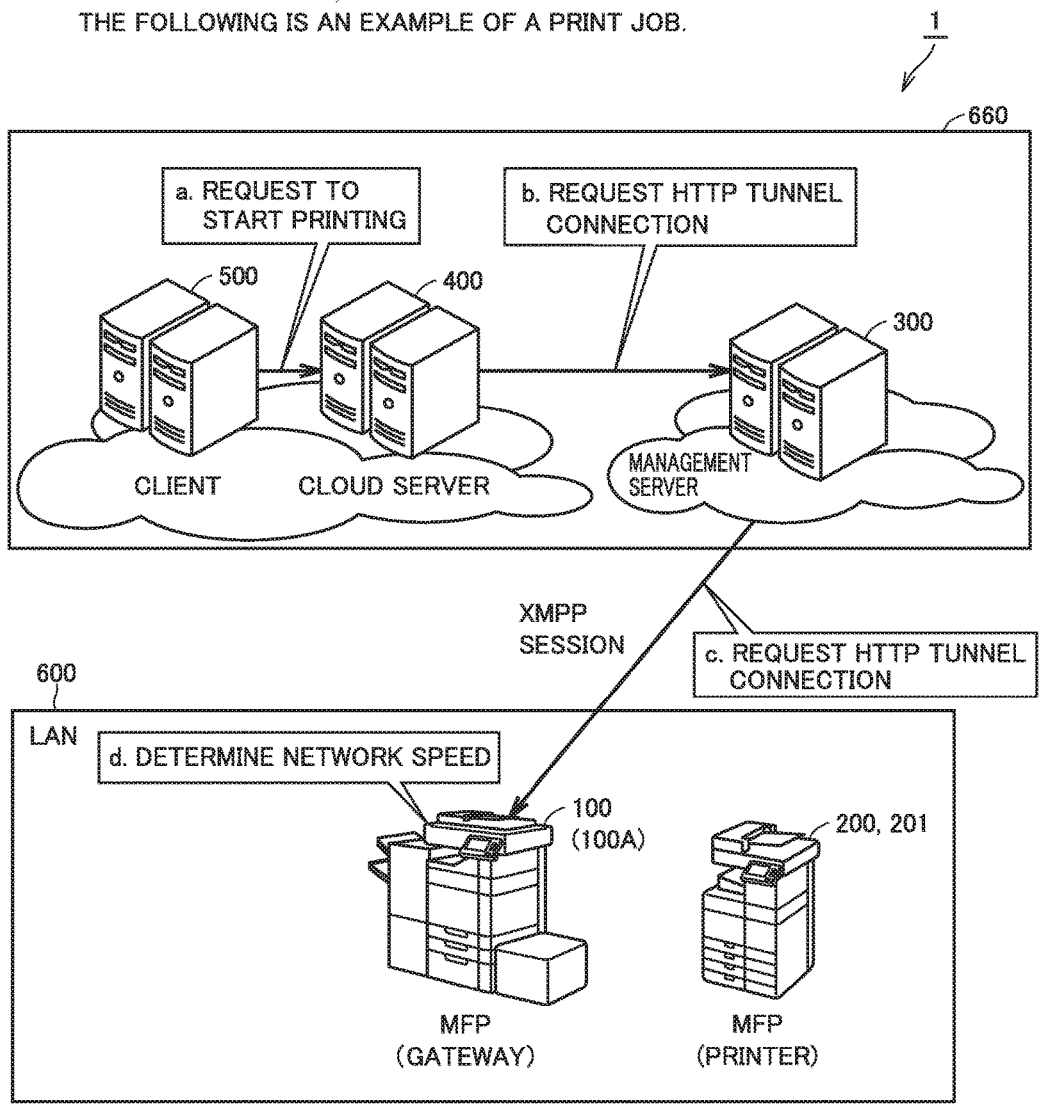
FIGS. 4 to 6 are diagrams for outlining an operation of each element in the communication system.
Figure 5:
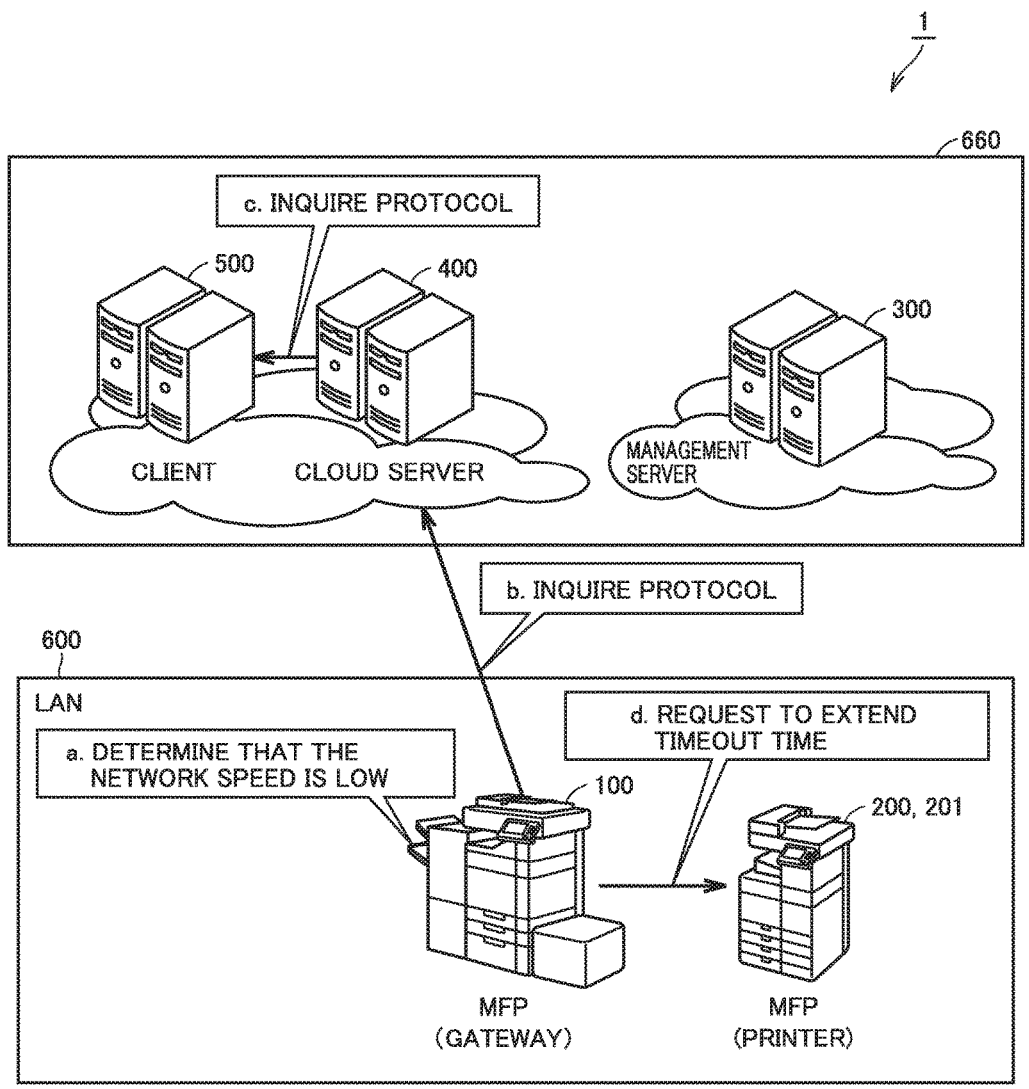
Figure 6:
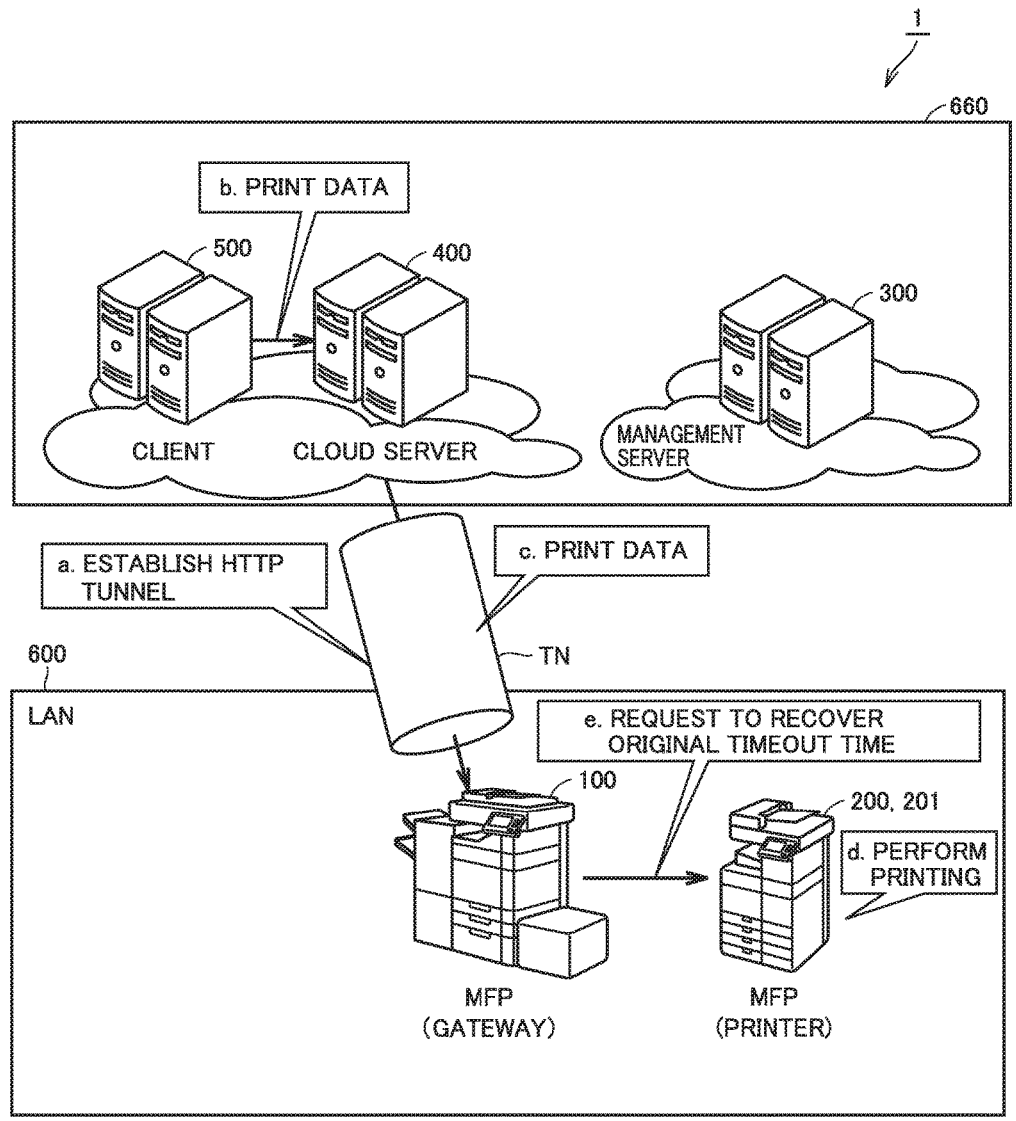

With reference to FIGS. 4 to 6, in communication system 1, a message session (as an exception of firewall) is established between management server 300 outside LAN 600 and gateway 100 inside LAN 600. Cloud server 400 accesses a device inside LAN 600 via management server 300 and gateway 100. Hereinafter, such an operation (a basic operation) in communication system 1 will be described.

As shown in FIG. 4, when gateway 100 is started or the like, it establishes a communication session (a message session) with management server 300 previously designated. An example of a protocol used for the message session is XMPP (eXtensible Messaging and Presence Protocol). Gateway 100 has transmitted to management server 300 information (management information) and the like of devices (devices 200, 201) managed by gateway 100.

Subsequently, when a request is generated from cloud server 400 to access a specific device (for example, device 200 or device 201), management server 300 transmits a tunnel connection request to gateway 100 using the message session. An example of the access request is a request from client 500 to cloud server 400 to execute a print job. A flow of such communication will more specifically be described with reference to FIG. 4.

As shown in FIG. 4, client 500 requests cloud server 400 to execute a print job (sec step a in FIG. 4). In response, to execute the print job, cloud server 400 transmits a request to management server 300 to access a specific device (see step b in FIG. 4). In response, management server 300 (for example, device 200 or device 201) transmits a tunnel connection request to a gateway (gateway 100) that manages the specific device (see step c in FIG. 4). The request is transmitted in accordance with HTTP (Hypertext Transfer Protocol), for example.

Gateway 100 receives the tunnel connection request, and measures as an example of a communication path of data involved in a print request a speed of communication of data in a cloud network to which cloud server 400 belongs (see step d i n FIG. 4). More specifically, in gateway 100, a value representing a communication speed is measured. The value is measured in a method for example by sending an ICMP packet using a ping command.

When gateway 100 determines that the communication speed is lower than a predetermined threshold value, gateway 100 re-sets and makes long a timeout time in a device accessed by cloud server 400 which is set for receiving the job. Gateway 100 transmits the reset timeout time to the device. Resetting the timeout time will be described with reference to FIG. 5.

When the tunnel connection request is received and at that time it is determined that the timeout time is later than a predetermined threshold value (see step a in FIG. 5) gateway 100 inquires of cloud server 400 what protocol is used to transmit data (see step b in FIG. 5). In response, cloud server 400 inquires of client 500 what protocol is used to transmit the job (see step c in FIG. 5).

For a print job, an example of the protocol used to transmit data is RAW. Another example is LPD. Still another example is IPP. Still another example is HTTP.

When cloud server 400 receives from client 500 information specifying the protocol, cloud server 400 transmits the information to gateway 100. In response, gateway 100 outputs a request to the device that is a recipient of the job to increase and thus change a timeout time for the protocol specified by the received information (see step d in FIG. 5).

Following the request, the device that is the recipient of the job can extend a timeout time only for a protocol corresponding to the data of the job. As a result, the device that is the recipient of the job can extend the timeout time for the protocol corresponding to the data of the job while maintaining a conventional timeout time for data transmitted using only a path different from a path followed to communicate the data of the job (for example, data transmitted using only LAN 600 (see FIG. 1)). Thus, even when an event has occurred to temporarily reduce a communication speed in the cloud network, an error of transmission of the job due to timeout less easily occurs.

In one embodiment, such an inquiry of a protocol as described above may not be made. That is, gateway 100 may output a request to a device to change a timeout time to be longer irrespective of the protocol.

FIG. 6 shows a flow of communication after a tunnel connection is established between cloud server 400 and gateway 100. In response to a tunnel connection request from management server 300 (see FIG. 4), gateway 100 transmits a request to cloud server 400 to establish an HTTP session (see step a in FIG. 6). More specifically, the HTTP session is a Hypertext Transfer Protocol Secure (HTTPS)

session. A request to establish an HTTP (HTTPS) session as described above is also referred to as a request to establish a tunnel connection.

When cloud server 400 approves the request, a tunnel connection TN by the HTTP session is established between gateway 100 and cloud server 400, as shown in FIG. 6. In other words, tunnel connection TN is established in response to an access from gateway 100 inside LAN 600 to cloud server 400 outside LAN 600.

Then, cloud server 400 uses tunnel connection TN to transmit various types of data via gateway 100 to a device (device 200 and/or device 201) (see steps b and c in FIG. 6). In the example of FIG. 6, "print data" is shown as an example of data transmitted. The print data is an example of data of a print job.

Gateway 100 receives print data from cloud server 400 and transmits the print data to the device (device 200 and/or device 201). In the device (device 200 and/or device 201), a timeout time for receiving the print data may have been extended as has been described as step d in FIG. 5.

When the device (device 200 and/or device 201) receives the print data, the device executes a print job in accordance with the print data.

Once the print job has ended, the device (device 200 and/or device 201) signals to gateway 100 that the print job has ended. If an instruction (or a request) has been made to increase a timeout time, as indicated in FIG. 5 as step d, then, gateway 100, in response to the end of the print job, instructs (or requests) the device (device 200 and/or device 201) to recover a previous timeout time (or cancel the extension) (see step e in FIG. 6).

<4. Sequence of Changing Timeout Time>

Figure 7:
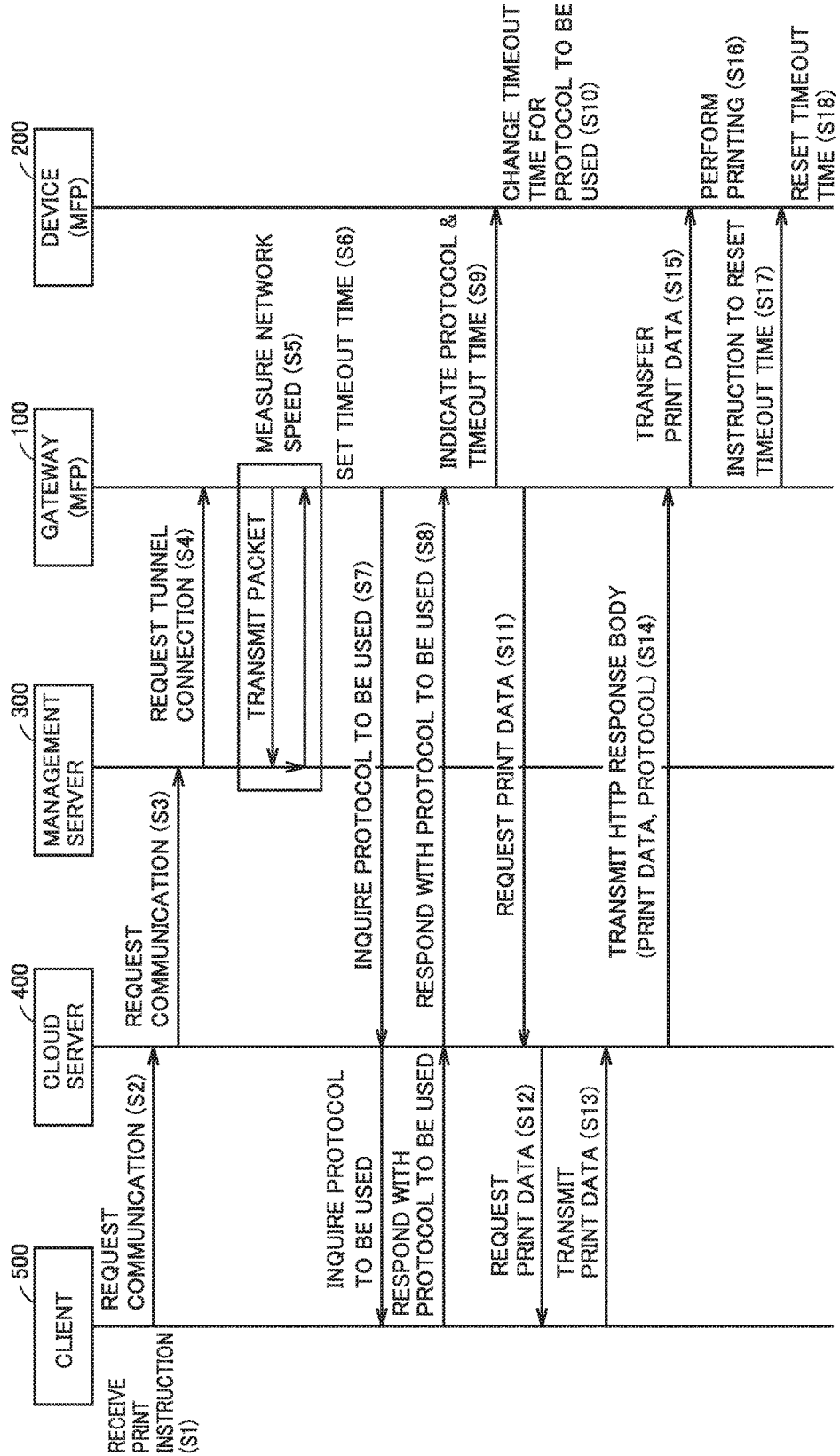
FIG. 7 is a diagram of a sequence of changing a timeout time in the communication system.

With reference to FIG. 7, a flow of data between devices in communication system 1 will be described in more detail. In the example of FIG. 7, of devices 200 and 201, device 200 is adopted as a recipient of a print job on LAN 600.

In step S1, client 500 receives an instruction for printing.

In step S2, client 500 transmits a request to cloud server 400 to establish communication with device 200. Step S2 corresponds to step a in FIG. 4.

In step S3, cloud server 400 transmits the request to management server 300 to establish communication with device 200. Step S3 corresponds to step b in FIG. 4.

In step S4, management server 300 requests gateway 100 to establish a tunnel connection. Step S4 corresponds to step c in FIG. 4.

In step S5, gateway 100 measures a communication speed of a communication path outside LAN 600 for data to be printed involved in the communication request issued from client 500. In one example, gateway 100 transmits a packet (for example, an ICMP packet) to management server 300 for measurement, and measures the communication speed by using a time elapsing before a response to the transmission of the packet is received. Step S5 corresponds to step d in FIG. 4.

In step S6, gateway 100 sets a timeout time of device 200 in accordance with the communication speed measured in step S5. In one example, gateway 100 determines a timeout time in accordance with a response time consumed in response to the transmission of the packet for measurement. FIG. 8 is a diagram showing an example of contents of a table that defines a relationship between a response time and a timeout time. It should be noted that a response time in response to transmission of a packet for measurement may be longer as a communication speed on a network is lower. That is, a response time may vary with a communication speed. Accordingly, in the present specification, when refer-ring to a behavior of communication in a network, the term "communication speed" and the term "response time" may be used synonymously.

In the table of FIG. 8, a response time (a response time in response to transmission of a packet for measurement) is associated with a timeout time. According to the example of FIG. 8, for a response time of less than 1 second, a timeout time of 10 seconds is set. A period of 10 seconds is an example of an initial value of a timeout time. That is, for a response time of less than 1 second, the timeout time's set value is not changed from the initial value. For a response time of 1 second or longer and less than 10 seconds, a timeout time of 20 seconds is set. In one example, the information corresponding to the table of FIG. 8 is stored in gateway 100 at storage unit 160 (see FIG. 2). When CPU 150 (see FIG. 2) of gateway 100 obtains the above-described response time, CPU 150 refers to the information stored in storage unit 160 to obtain a set value of the timeout time.

Returning to FIG. 7, in step S7, gateway 100 inquires of cloud server 400 what protocol is used to transmit the print data. Step S7 corresponds to step b in FIG. 5.

In response to the inquiry in step S7, cloud server 400 inquires of client 500 what protocol is used to transmit the print data. This step corresponds to step c in FIG. 3.

It should be noted that gateway 100 may be configured to make the inquiry in step S7 if the communication speed measured in step S5 is lower than a specific speed. This corresponds to step a in FIG. 5. If the communication speed measured in step S5 is equal to or higher than the specific speed, gateway 100 may not perform step S6 and may instead proceed to step S11, which will be described later.

In response to the inquiry from cloud server 400, client 500 returns to cloud server 400 a protocol used to transmit the print data. In response, cloud server 400, in step S8, returns to gateway 100 the protocol used to transmit the print data.

In step S9, gateway 100 instructs (or requests) device 200 to change a timeout time for the protocol received in step S8 to the value set in step S6.

In step S10, device 200, in response to the instruction (or request) from gateway 100, changes a timeout time for the designated protocol. More specifically, in device 200 CPU 150 (see FIG. 2) stores, for example, a designated timeout time for the specified protocol to storage unit 160.

In step S11, gateway 100 requests cloud server 400 to transmit the print data (data of a print job).

In step S12, cloud server 400 requests client 500 to transmit the print data (the data of the print job).

In step S13, client 500 transmits the print data to cloud server 400.

In step S14, cloud server 400 transmits the print data to gateway 100. Cloud server 400 transmits the print data to gateway 100 by using an HTTP tunnel (tunnel TN shown in FIG. 6) between cloud server 400 and gateway 100. Accordingly, cloud server 400 transmits to gateway 100 the print data wrapped in a packet of the HTTP protocol.

In step S15, gateway 100 transfers to device 200 the print data received from cloud server 400. In doing so, the print data transmitted from gateway 100 to device 200 is print data extracted from the print data wrapped in the packet of the HTTP protocol (see step S14).

In step S16, device 200 executes the print job. Step S16 corresponds to step d in FIG. 6.

In step S17, gateway 100 instructs (or requests) device 200 to reset the timeout time. Step S17 corresponds to step e in FIG. 6.

In response to the instruction (or request) in step S17, device 200 in step S18 returns to the initial value the timeout time changed in step S10.

<5. Flow of Process in Gateway 100>

Figure 9:
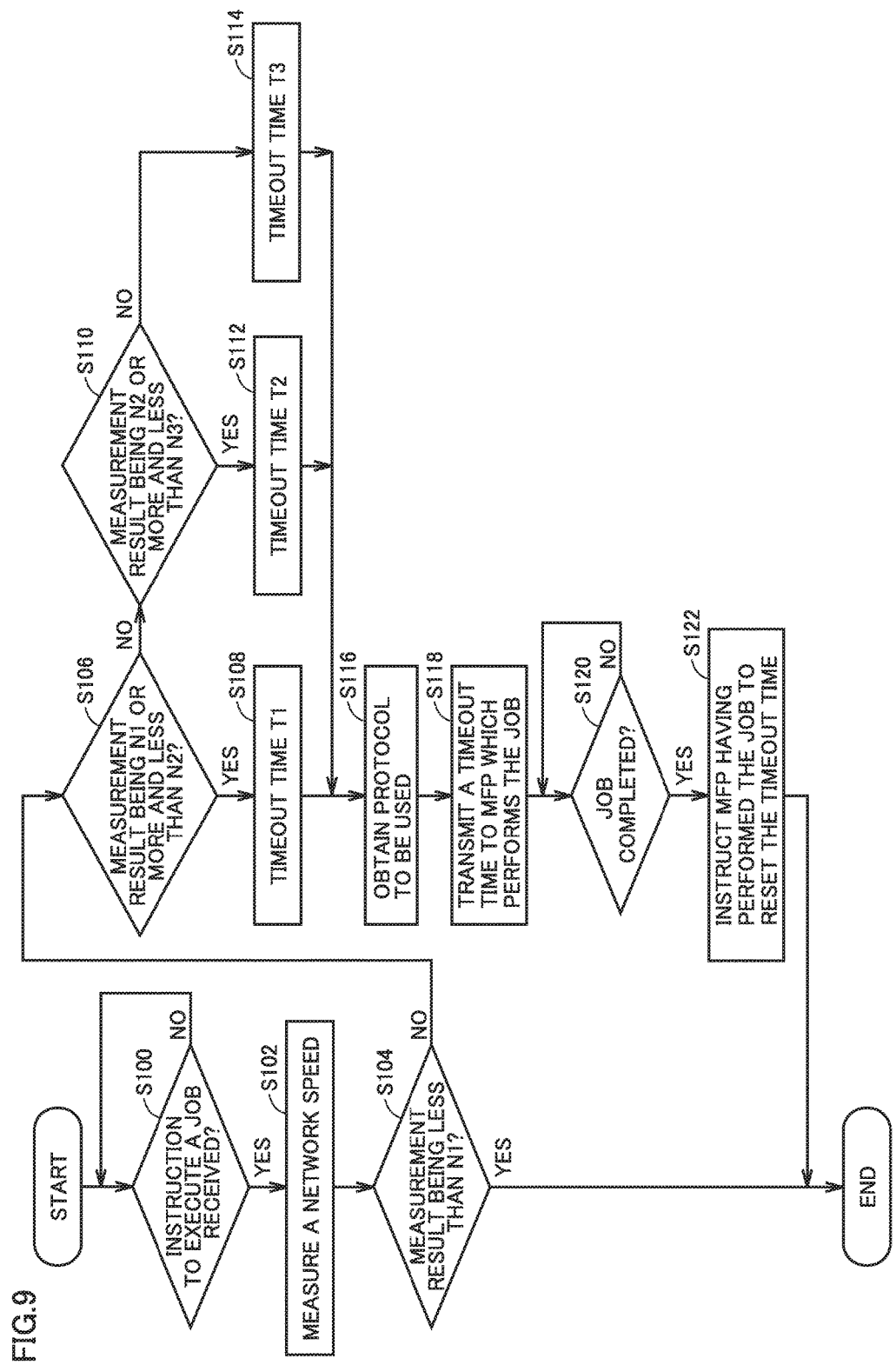
FIG. 9 is a flowchart of a process performed in the gateway for setting a timeout time.

FIG. 9 is a flowchart of a process executed in gateway 100 by CPU 150 (see FIG. 2) for setting a timeout time. The process in FIG. 9 corresponds to step S6 in FIG. 7.

As shown in FIG. 9, in step S100, CPU 150 determines whether an instruction to execute a job has been received. The instruction to execute the job is included in a tunnel connection request made from management server 300, as indicated in FIG. 7 at step S4 for example. Until CPU 150 determines that the instruction to execute the job has been received, CPU 150 stays at step S100 (NO in step S100), and once CPU 150 has determined that the instruction to execute the job has been received (YES in step S100), CPU 150 proceeds to step S102.

In step S102, CPU 150 measures a response time on a network constituting a path for transmission of data of the job indicated in step S100. This measurement is implemented for example by sending an ICMP packet using a ping command. An example of a network on which a response time is measured is a network which is located outside LAN 600 and which a device that is a sender of an instruction to execute a job belongs to.

In step S104, CPU 150 determines whether a result of measuring a response time in step S102 is less than N1 (second). If the response time is less than N1 (second), CPU 150 ends the process of FIG. 9 (YES in step S104). In that case, the device that executes the job has a timeout time unchanged. Thus, in one example, the device has the timeout time held at an initial value. On the other hand, if the response time is equal to or longer than N1 (second), CPU 150 proceeds to step S106 (NO in step S104).

In step S106, CPU 150 determines whether a result of measuring a response time in step S102 is less than N2 (second). N2 (second) is longer than N1 (second). If the response time is less than N2 (second), CPU 150 proceeds to step S108 (YES in step S106). If the response time is equal to or longer than N2 (second), CPU 150 proceeds to step S110 (NO in step S106).

In step S110, CPU 150 determines whether a result of measuring a response time in step S102 is less than N3 (second). N3 (second) is longer than N2 (second). If the response time is less than N3 (second), CPU 150 proceeds to step S112 (YES in step S110). If the response time is equal to or longer than N3 (second), CPU 150 proceeds to step S114 (NO in step S110).

In steps S108, S112, and S114, CPU 150 sets timeout times for the job involved in the instruction made in step S100 to times T1, T2, T3, respectively.

According to the example of FIG. 8, an example of N1 (second) is "1 second," an example of N2 (second) is "10 seconds." and an example of N3 (second) is "30 seconds." An example of the initial value of the timeout time is 10 seconds. An example of timeout time T1 is 20 seconds, an example of timeout time T2 is 40 seconds, and an example of timeout time T3 is 60 seconds. That is, the longer a response time on a network is, the longer a timeout time is set to be.

After timeout times are set in steps S108, S112, and S114, respectively, CPU 150 in step S116 obtains from the sender of the instruction to execute the job a protocol used to transmit the job's data. More specifically, CPU 150 inquires of the sender the protocol to be used and obtains a response to the inquiry.

In step S118, CPU 150 transmits to the device that executes the indicated job a timeout time set in any one of steps S108, S112 and S114, and CPU 150 also instructs (or requests) the device to change the current timeout time.

In step S120, CPU 150 determines whether the indicated job has ended in the device. For example, CPU 150 determines whether the job has ended based on whether data indicating that the job has ended has been received from the device. Until CPU 150 determines that the job has ended, CPU 150 stays at step S120 (NO in step S120), and once CPU 150 has determined that the job has ended, CPU 150 proceeds to step S122 (YES in step S120).

In step S122, CPU 150 instructs (or requests) the device that has executed the job to reset the timeout time. As a result, the timeout time of the device is returned to the initial value. Thereafter, the process of FIG. 9 ends.

As described above, in the process described with reference to FIG. 9, in step S102, instead of measuring a response time, a numerical value representing a communication speed may be measured. Further, instead of measuring the numerical value, CPU 150 may receive the numerical value from another device. In step S102, CPU 150 may at least obtain a value representing a communication speed of a communication path through which a job's data is transmitted.

In step S104, a timeout time may be set in accordance with the value representing the communication speed of the communication path of the job's data. Even if a communication speed itself is not obtained, when a value representing the communication speed is obtained a timeout time is set depending on whether a communication speed estimated from the value is low or high. The lower the estimated communication speed is, the longer the timeout time is set to be.

Furthermore, in step S104, a timeout time may be set in accordance with a communication speed expected in the future, rather than the current communication speed. In one example, CPU 150 obtains a plurality of response times of a latest predetermined period (for example of about several seconds) in step S102. In step S104, CPU 150 derives from the plurality of response antes a tendency of how they vary. From the tendency, whether a response time for a period of transmission of job data to be started from now will be longer than a predetermined threshold is estimated. If the response time is estimated to be longer than the threshold value, CPU 150 sets a timeout time from an initial value and instructs (or requests) the device to change the current timeout time. In another example, CPU 150 estimates from a communication history on a network a communication speed for a period of transmission of job data to be started from now. If CPU 150 determines that the estimated response time is lower than a predetermined threshold value, CPU 150 sets a timeout time from an initial value and instructs (or requests) the device to change the current timeout time.

(Instruction From Device in LAN 600 to Execute Job)

An instruction to execute a job may be transmitted from a device in LAN 600 to a device outside LAN 600. An example of a job indicated in such an example is a scan job. For example, a user instructs a device (for example, device 200) in LAN 600 to scan an original document and save to client 500 the data generated by the scanning.

In that case, in the process of FIG. 9, CPU 150 receives an instruction to execute a job from device 200. Device 200 also uses image reading unit 153 to generate scan data in the scan job. In this sense, device 200 is an example of an image processing apparatus that executes a job, and the scan job is an example of a job executed in the image processing apparatus. Device 200 transmits the scan data toward client 500. Client 500 responds to device 200 with a data reception status (normal/abnormal). In device 200, a timeout time for the response is set. When a communication speed on a communication path for the data is lower than a predetermined threshold value, gateway 100 instructs device 200 to change the timeout time to be long.

<6. Summary of Disclosure>

In communication system 1 described with reference to FIGS. 1 to 9, gateway 100 is an example of a management device in communication system 1.

In gateway 100, communication control unit 41 (see FIG. 3) is an example of a communication interface configured to control transmission and reception of print data, as has been described as steps S13 to S15 in FIG. 7, and transmit and receive a job executed in an image processing apparatus (for example, devices 200 and 201).

Rate measurement unit 45 (see FIG. 3) is one example of a speed acquisition unit configured to measure a network speed, as has been described with reference to step S5 in FIG. 7, to obtain information representing a communication speed of a path for communication of a job transmitted and received by a communication unit.

Operation control unit 47 (see FIG. 3) is an example of a setting unit configured to set a timeout time, as has been described with reference to step S6 in FIG. 7, and, based on the information obtained by the speed acquisition unit and representing a communication speed, set a timeout time for the image processing apparatus that executes the job.

According to the present disclosure, a relay device determines whether is necessary to increase a timeout time in an image processing apparatus, based on a communication speed on a communication path through which a job is transmitted and received. Thus, when a cause of a delay of transmission of data is not a sender and/or recipient of a job but a state of a communication path alone, an increased timeout time can prevent retransmission due to timeout.

Furthermore, on LAN 600, only a device communicating with a device outside LAN 600 for transmitting and receiving a job has a timeout time changed. This can prevent an unnecessarily increased timeout time in communications between devices on LAN 600 and an unnecessarily increased timeout time in a device communicating with a device outside LAN 600 without transmitting or receiving a job.

[II. Local Area Network]

Figure 10:
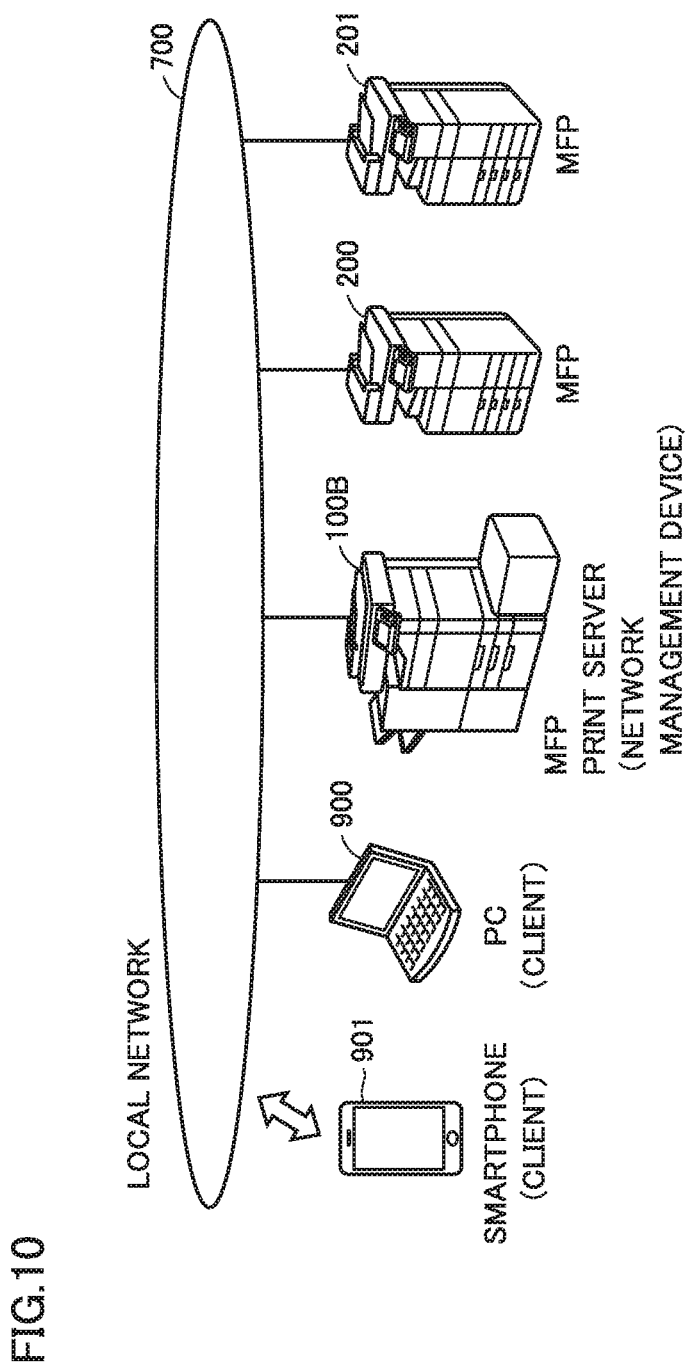
FIG. 10 is a diagram showing a schematic configuration of a communication system according to an embodiment.
Figure 11:
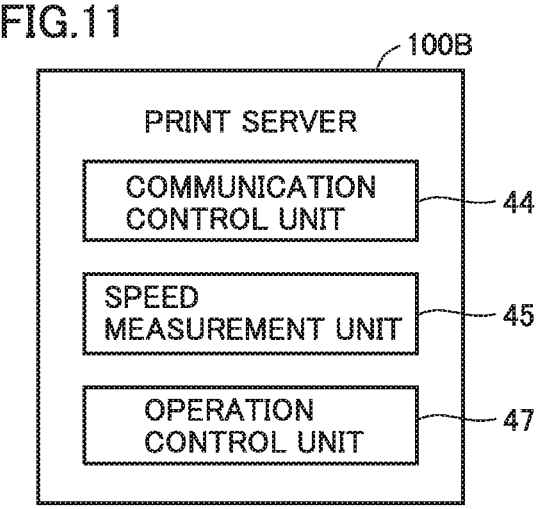
FIG. 11 is a diagram showing an example of a functional configuration of a print server.
Figure 12:
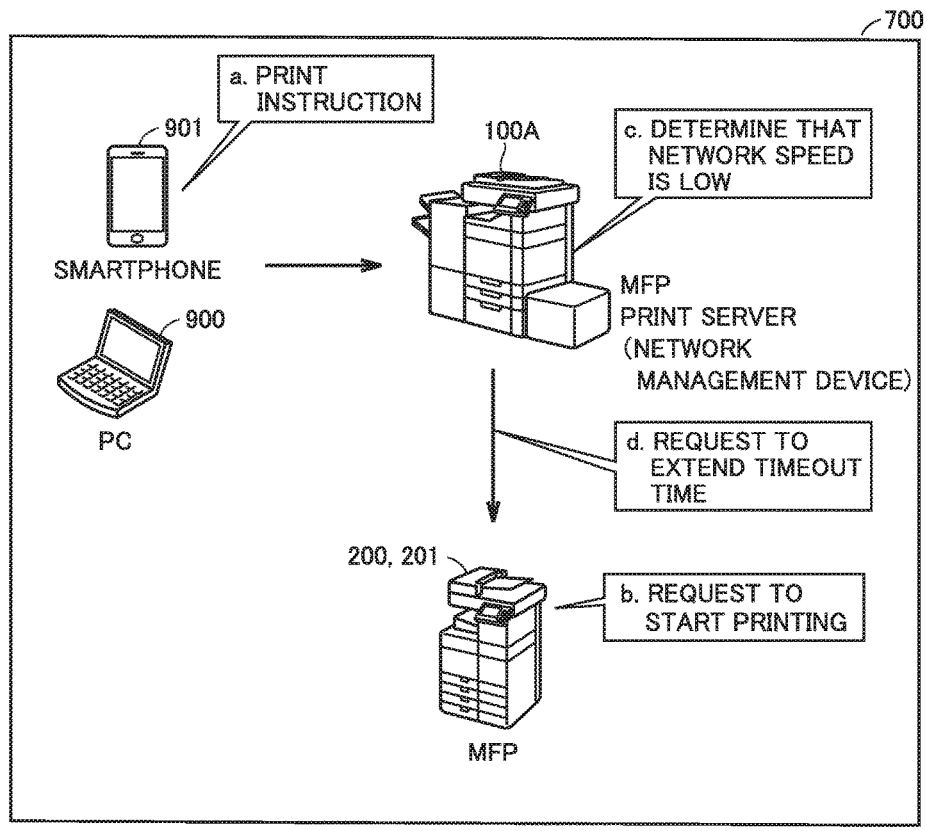
FIG. 12 is a diagram for outlining an operation of each element in issuing an instruction for printing in a LAN, and performing the printing.

Reference will now be made to FIGS. 10 to 12 to describe a local area network as an embodiment of a communication system according to the present disclosure.

<1. Outlining System Configuration>

In the example of FIG. 10, a local area network (LAN) 700 configures a communication system. LAN 700 includes a print server 100A, clients 900, 901, and devices 200, 201. Print server 100A is an example of the management device. Print server 100A can have a hardware configuration similar to that of gateway 100 shown in FIG. 2.

In one embodiment, print server 100A and devices 200, 201 are each implemented by an MFP, client 900 is implemented by a personal computer (PC), and client 901 is implemented by a smartphone. In one embodiment, print server 100A, client 900, and devices 200, 201 are cabled to LAN 700 and client 901 is wirelessly connected to LAN 700. However, in LAN 700, print server 100A, clients 900, 901, and devices 200, 201 may be implemented by any type of device as long as they have a communication function. Further, they may communicate via a cable or wirelessly.

<2. Functional Configuration of Print Server 100A>

Referring to FIG. 11, print server 100A includes a communication control unit 44. Communication control unit 44 acts as a server and controls communication between devices in LAN 700. Print server 100A further includes speed measurement unit 45 and operation control unit 47, similarly as gateway 100 shown in FIG. 3 does.

<3. Outlining Operation of Each Element of Communication System>

Reference will now be made to FIG. 12 to outline an operation of each element in issuing an instruction for printing in LAN 700, and performing the printing.

As shown as step a in FIG. 12, a user instructs device 901 (a smartphone) or device 900 (a PC) to print a file. In the following description, of device 901 (the smartphone) and device 900 (the PC), a device that is instructed to print the file will simply be referred to as a "device." In response to the instruction, the device spools print data (i.e., data of a print job) to print server 100A.

When print server 100A receives a print instruction, print server 100A notifies a device that is a recipient of the print instruction that the print instruction has been received. In response to the notification, the device instructs print server 100A to output the print data.

In response to the instruction from the device, print server 100A determines whether a communication speed (a network speed) on LAN 700 is lower than a predetermined threshold value. When print server 100A determines that the network speed is the threshold value or higher, print server 100A transfers the print data to a device. The device executes the print job in accordance with the received print data.

In contrast, as indicated in FIG. 12 by step c, when print server 100A determines that the network speed is lower than the threshold value, print server 100A requests the device to extend a timeout time, as indicated in FIG. 12 by step d. In response, the device increases the timeout time.

Subsequently, the device performs the print job. When the print job has ended, the device notifies the requester of the print job via print server 100A that the print job has ended. In response to the print job having ended, print server 100A requests the device to return the timeout time to (or recover) the initial value. In response, the device returns the timeout time to the initial value.

<4. Sequence of Changing Timeout Time>

Figure 13:
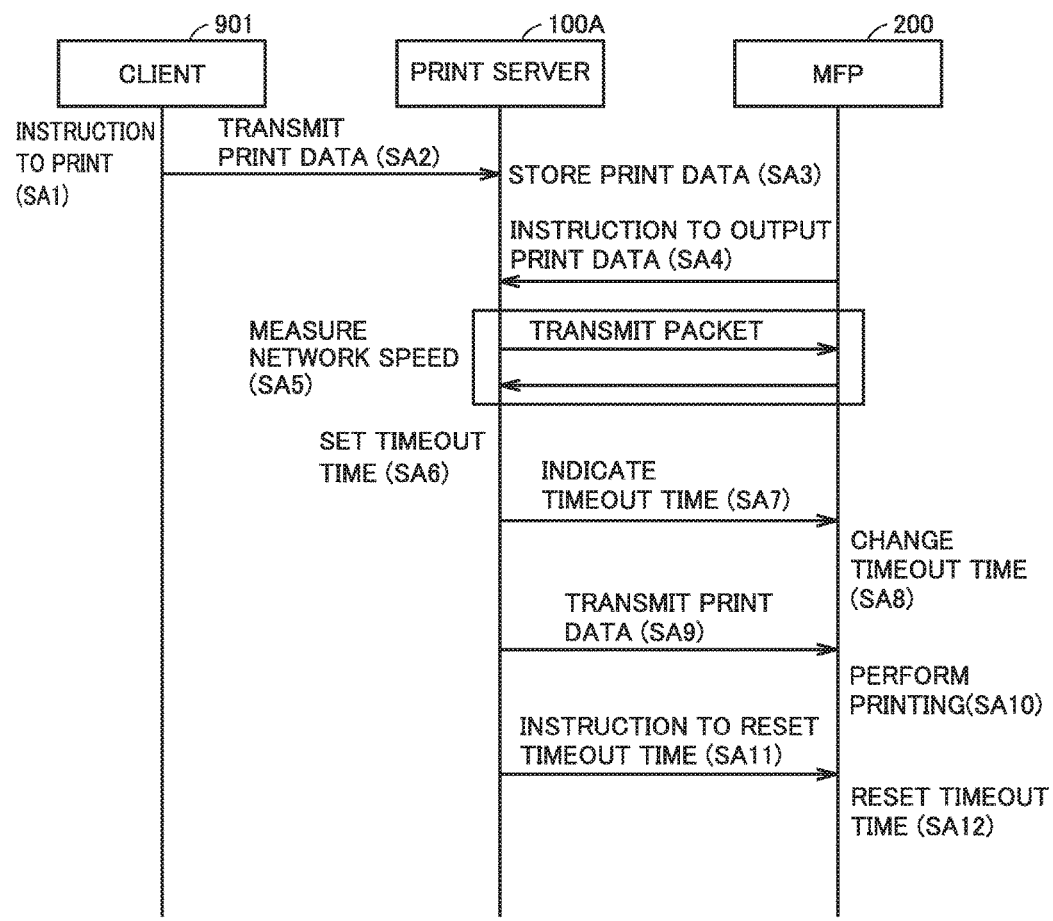
FIG. 13 is a diagram of a sequence of changing a timeout time in a LAN, as described with reference to FIG. 12.

With reference to FIG. 13, a flow of data between devices in LAN 700 will be described in more detail. In the example of FIG. 13, client 901 is adopted as an example of a sender of a print job, and device 200 is adopted as a recipient of the print job.

In step SA1, client 901 receives an instruction from a user for printing to be done by device 200.

In step SA2, client 901 transmits to print server 100A print data (data of a print job) directed to device 200.

In step SA3, the print data is spooled (or stored) in print server 100A. Print server 100A notifies device 200 that print server 100A starts to transmit the print data to device 200. In response, in step SA4, device 200 instructs print server 100A to output the print data.

In step SA5, print server 100A measures a value representing a communication speed (a network speed) on LAN 700. In one example, for this measurement, print server 100A transmits a packet to device 200 for measuring the communication speed, receives a response thereto, and determines a time difference between the transmission and the reception as a response time. This response time is an example of a value representing the communication speed on LAN 700.

In step SA6, print server 100A sets a timeout time for the job having print data spooled in step SA3, based on the value obtained in step SA5 representing a communication speed. The timeout time can be set in the method described with reference to FIG. 8, for example. Accordingly, how the timeout time is set will not be described redundantly in detail.

In step SA7, print server 100A instructs device 200 to set a timeout time.

In step SA8, device 200 changes the timeout time of device 200 to the timeout time indicated from print server 100A in step SA7.

In step SA9, print server 100A transmits to device 200 the print data spooled in step SA3. In response, device 200 receives the print data.

In step SA10, device 200 executes a print job in accordance with the received print data. When the print job has ended, device 200 notifies print server 100A that the print job has ended.

In step SA11, print server 100A, in response to the notification from device 200 of the end of the print job, instructs device 200 to reset the timeout time (or return it to the initial value).

In step SA12, device 200 resets the timeout time in device 200.

<5. Summary of Disclosure>

In LAN 700 described with reference to FIGS. 10 to 12, print server 100A is an example of a management device in LAN 700.

In print server 100A, communication control emit 44 (see FIG. 11) is an example of a communication unit configured to control such transmission and reception of print data as has been described with reference to steps SA2 and SA9 in FIG. 13, and transmit and receive a job executed in an image processing apparatus (for example, devices 200 and 201).

Rate measurement unit 45 (see FIG. 1 a speed acquisition unit configured to measure a network speed, as has been described with reference to step SA5 in FIG. 13, to obtain information representing a communication speed of a path for communication of a job transmitted and received by a communication unit.

Operation control unit 47 (see FIG. 11) is an example of a setting unit configured to set a timeout time, as has been described with reference to step SA6 in FIG. 13, and, based on the information obtained by the speed acquisition unit and representing a communication speed, set a timeout time for the image processing apparatus that executes the job.

While in the examples of FIGS. 10 to 12 the image processing apparatus is a recipient of data of a job, the image processing apparatus can also be a sender thereof. For example, for a scan job, the image processing apparatus can transmit data of a job to client 900 or the like in order to request storage of image data generated by scanning.

According to the present disclosure, a relay device determines whether it is necessary to increase a timeout time in an image processing apparatus, based on a communication speed on a communication path through which a job is transmitted and received. Thus, when a cause of a delay of transmission of data is not a sender and/or recipient of a job but a state of a communication path alone, an increased timeout time can prevent retransmission due to timeout.

Although embodiments of the present invention have been described and illustrated in detail, it is clearly understood that the same is by way of illustration and example only and not limitation, the scope of the present invention should be interpreted by terms of the appended claims.

What is claimed is:

1. A management device comprising:
a communication interface; and
a hardware processor,
wherein the communication interface transmits and receives a job to be executed in an image processing apparatus,
wherein the hardware processor:
before transmission and reception of a job, transmits data on a communication path of the job for measuring a communication speed to obtain information representing a communication speed of a communication path for the job transmitted and received by the communication interface; and
sets a timeout time of the image processing apparatus that executes the job, based on the obtained information representing a communication speed,
wherein the communication interface relays transmission and reception of a job between (i) an outside of a LAN (Local Area Network) to which the image processing apparatus belongs and (ii) the image processing apparatus, and
wherein the hardware processor obtains information representing a communication speed outside the LAN as information representing a communication speed of a communication path of the job.

2. The management device according to claim 1, wherein the hardware processor is configured to change the timeout time to be longer than a current state when a communication speed determined based on the obtained information representing a communication speed is lower than a given speed.

3. The management device according to claim 2, wherein the hardware processor is configured such that after the job ends the hardware processor returns the timeout time to a value thereof set before the timeout time is changed.

4. The management device according to claim 1, wherein the hardware processor is configured to maintain the timeout time in a current state when a communication speed determined based on the obtained information representing a communication speed is higher than a given speed.

5. The management device according to claim 1, wherein the hardware processor further obtains a type of the job, and
the timeout time is a timeout time in the image processing apparatus for a protocol corresponding to the obtained type.

6. A communication system comprising:
an image processing apparatus that executes a job; and
a management device,
wherein:
the management device includes a hardware processor and a communication interface,
the communication interface transmits and receives a job to be executed in the image processing apparatus,
the hardware processor:
before transmission and reception of a job, transmits data on a communication path of the job for measuring a communication speed to obtain information representing a communication speed of a communication path for the job transmitted and received by the communication interface; and
sets a timeout time of the image processing apparatus that executes the job, based on the obtained information representing a communication speed,
the communication interface relays transmission and reception of a job between (i) an outside of a LAN (Local Area Network) to which the image processing apparatus belongs and (ii) the image processing apparatus, and the hardware processor obtains information representing a communication speed outside the LAN as information representing a communication speed of a communication path of the job.

7. The communication system according to claim 6, wherein the hardware processor is configured to change the timeout time to be longer than a current state when a communication speed determined based on the obtained information representing a communication speed is lower than a given speed.

8. The communication system according to claim 7, wherein the hardware processor is configured such that after the job ends the hardware processor returns the timeout time to a value thereof set before the timeout time is changed.

9. The communication system according to claim 6, wherein the hardware processor is configured to maintain the timeout time in a current state when a communication speed determined based on the obtained information representing a communication speed is higher than a given speed.

10. The communication system according to claim 6, wherein the hardware processor further obtains a type of the job, and the timeout time is a timeout time in the image processing apparatus for a protocol corresponding to the obtained type.

11. A non-transitory storage medium having stored therein a program executed by a computer configured to set a timeout time in an image processing apparatus which transmits and receives a job, the program causing the computer to:

before transmission and reception of a job, transmit data on a communication path of the job for measuring a communication speed to obtain information representing a communication speed of a communication path for the job transmitted and received; and set a timeout time of the image processing apparatus that executes the job, based on the obtained information representing a communication speed, wherein program further causes the computer to:

relay transmission and reception of a job between (i) an outside of a LAN (Local Area Network) to which the image processing apparatus belongs and (ii) the image processing apparatus, and obtain information representing a communication speed outside the LAN as information representing a communication speed of a communication path of the job.

12. A computer-implemented method, comprising:

before transmission and reception of a job, transmitting data on a communication path of the job for measuring a communication speed to obtain information representing a communication speed of a communication path for the job transmitted and received; and setting a timeout time of an image processing apparatus that executes the job, based on the obtained information representing a communication speed, wherein the method further comprises relaying transmission and reception of a job between (i) an outside of a LAN (Local Area Network) to which the image processing apparatus belongs and (ii) the image processing apparatus, and obtaining information representing a communication speed outside the LAN as information representing a communication speed of a communication path of the job.

13. The computer-implemented method according to claim 12, further comprising:

changing the timeout time to be longer than a current state when a communication speed determined based on the obtained information representing a communication speed is lower than a given speed.

14. The computer-implemented method according to claim 12, further comprising:

maintaining the timeout time in a current state when a communication speed determined based on the obtained information representing a communication speed is higher than a given speed.

15. The computer-implemented method according to claim 12, further comprising:

obtaining a type of the job, wherein the timeout time is a timeout time in the image processing apparatus for a protocol corresponding to the obtained type.

\* \* \* \* \*